United States Patent
Chou et al.

(10) Patent No.: US 7,541,755 B2
(45) Date of Patent: Jun. 2, 2009

(54) INDUCTIVE LOAD BROADBAND RF SYSTEM

(75) Inventors: Weiren Chou, Aurora, IL (US); David Wildman, Aurora, IL (US); Akira Takagi, Ibaraki (JP)

(73) Assignee: Universities Research Association, Inc., Washington, DC (US)

( * ) Notice: Subject to any disclaimer, the term of this patent is extended or adjusted under 35 U.S.C. 154(b) by 567 days.

(21) Appl. No.: 11/294,300

(22) Filed: Dec. 2, 2005

(65) Prior Publication Data

US 2007/0080303 A1  Apr. 12, 2007

Related U.S. Application Data

(60) Provisional application No. 60/725,912, filed on Oct. 11, 2005.

(51) Int. Cl.
*G06F 15/16* (2006.01)
(52) U.S. Cl. .................. 315/505; 315/5.41; 315/507
(58) Field of Classification Search ............... 315/5, 315/5.35, 5.39, 5.41, 5.42, 500, 501, 505, 315/507; 250/396 R, 396 ML, 398, 400
See application file for complete search history.

(56) References Cited

U.S. PATENT DOCUMENTS

| | | | | |
|---|---|---|---|---|
| 2,480,169 A | * | 8/1949 | Westendorp | 315/500 |
| 2,567,904 A | * | 9/1951 | Christofilos | 315/503 |
| 2,738,420 A | * | 3/1956 | Lawson | 315/507 |
| 4,730,166 A | * | 3/1988 | Birx et al. | 315/500 |
| 4,835,446 A | * | 5/1989 | Nation et al. | 315/5.13 |
| 5,811,944 A | * | 9/1998 | Sampayan et al. | 315/505 |
| 6,278,239 B1 | * | 8/2001 | Caporaso et al. | 315/5.41 |
| 7,348,569 B2 | * | 3/2008 | Feurer et al. | 250/400 |
| 2005/0134515 A1 | * | 6/2005 | Copeland et al. | 343/788 |
| 2005/0279947 A1 | * | 12/2005 | Feurer et al. | 250/398 |

* cited by examiner

*Primary Examiner*—David Hung Vu
*Assistant Examiner*—Tung X Le
(74) *Attorney, Agent, or Firm*—Richard H. Krukar; Kermit D. Lopez; Luis M. Ortiz

(57) ABSTRACT

Many applications in scientific experimentation or industrial production require the generation and shaping of charged particle bunches. A particle bunch shaper can use less expensive and smaller electrical waveform generators when the particle bunch shaper uses a nanocrystalline magnetic material. High voltage switches are examples of electrical waveform generators. A pipe with two conductive sections separated by a ceramic gap can be run through the center of cores made with the nanocrystalline magnetic material to produce the particle bunch shaper. A voltage waveform transmitted from an electrical waveform generator, through a damping circuit, and through a coupling wire running adjacent to the pipe sections can shape charged particle bunches.

16 Claims, 6 Drawing Sheets

INDUCTIVE LOAD BROADBAND RF SYSTEM

REFERENCE TO RELATED APPLICATION

This patent application claims priority under 35 U.S.C. §119(e) to provisional patent application Ser. No. 60/725,912 entitled "Inductive Load Broadband RF System" which was filed on Oct. 11, 2005, the disclosure of which is incorporated herein by reference provisional patent application.

TECHNICAL FIELD

Embodiments relate to the field of particle accelerators. Embodiments also relate to the fields of pulsed power, electric pulse formation and electrical pulse shaping. Embodiments additionally relate to the field of shaping traveling charged particle bunches.

BACKGROUND

Particle accelerators are items commonly encountered, such as the cathode ray tubes of television sets. As with many items, however, particle accelerators occur in a variety of other applications such as scientific research, semiconductor processing, and medical imaging. Unlike a cathode ray tube, which continually produces an electron beam, many accelerators produce particle bunches. A particle bunch is a clump of particles traveling together. When produced, many particle bunches need shaping. Shaping means adjusting the bunch such as compressing it, stretching it, deflecting it, or tilting it.

FIG. 6, labeled as "prior art", illustrates particle bunches being shaped. A particle bunch 601 is traveling from left to right when it encounters a stretcher 602 that transforms it into a stretched particle bunch 603 that is still traveling to the right. A compressor 604 then compresses the stretched particle bunch 603 into a compressed particle bunch 605. The stretcher 602 and the compressor 604 are examples of particle bunch shapers. Those practiced in the art of particle acceleration know of other manipulations, such as deflection and tilting, that are not illustrated here.

FIG. 7, labeled as "prior art" shows a rudimentary particle bunch shaper 701. The particle bunch shaper 701 is a tube 703 with a first electrode 702 on one end and a second electrode 704 on the other. The inside of the tube 703 is held in vacuum, meaning there are hardly any air molecules inside it. As such, the tube 703 is part of a vacuum system because particle bunches are usually maintained in vacuum. A voltage waveform source 705 is connected to the first electrode 702 and the second electrode 704. The voltage waveform and how the voltage waveform is synchronized with the movement of the charged particle bunches determines what the particle bunch shaper does. Different waveforms and synchronization can cause the particle bunch shaper to be a compressor, stretcher, accelerator, decelerator, tilter, or deflector. The shape of the tube and electrodes can also cause changes to particle bunch shape or other properties.

Current systems and methods cause voltage waveform sources used in particle bunch shapers to see a resistive load. The most common load is 50 ohms. A high voltage waveform source feeding into a 50 ohm load is very expensive because of the large electrical currents involved.

High power laser systems have power constraints that are similar to those of systems that manipulate charged particles. U.S. Pat. Nos. 5,754,579 and 6,914,919 disclose systems and methods for shaping high power electrical pulses. Both patents use a class of material called a nanocrystalline magnetic material. Nanocrystalline magnetic materials are discussed in detail in U.S. Pat. No. 5,591,532 and United States Patent Application 20050134515. More specifically, three nanocrystalline magnetic materials are discussed. One of them is Finemet or FeCuNbSiB. Another is Nanoperm or FeZrNbCu. A third is Hitperm or FeCoZrBCu. Other nanocrystalline magnetic materials exist. The disclosed laser systems use nanocrystalline magnetic materials for electrical pulse shaping.

There is therefore a need for systems and methods that use nanocrystalline magnetic materials for shaping charged particle bunches and thereby enable the use of less expensive high voltage waveform source.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is therefore one aspect of the embodiments to overcome the shortcomings of current technology by providing a high voltage switch that produces a voltage waveform that is transmitted to a damping network. The waveform can be transmitted by wires, transmission lines, or any other method known to those practiced in the art of electrical power transmission. A coupling wire that passes through at least one core electrically connects the output nodes of the damping network. A pipe also passes through the cores. The pipe has three sections. The three sections are a first conductive section, a ceramic section, and a second conductive section. The conductive sections can be made of steel.

It is a further aspect of the embodiments that the cores are made with nanocrystalline magnetic material. The pipe passes through the cores. Three examples of nanocrystalline magnetic material are Finemet, Nanaperm, and Hitperm.

An aspect of certain embodiments is to use a step down transformer, step up transformer, and transmission lines to transmit the voltage waveform from the high voltage switch to the damping network. The step down transformer decreases current and increases voltage while the step up transformer increases current and decreases voltage.

Another aspect of certain embodiments is to provide a second high voltage switch. The second high voltage switch can be electrically connected to the damping network in a manner similar to that of the first high voltage switch. The two high voltage switches together can produce a voltage waveform that is transmitted to the damping network.

Yet another aspect of certain embodiments is to provide an injector that can inject charged particle bunches into one end of the pipe. Subatomic particles such as electrons and protons are charged particles. Ions are also charged particles.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Figure 1:
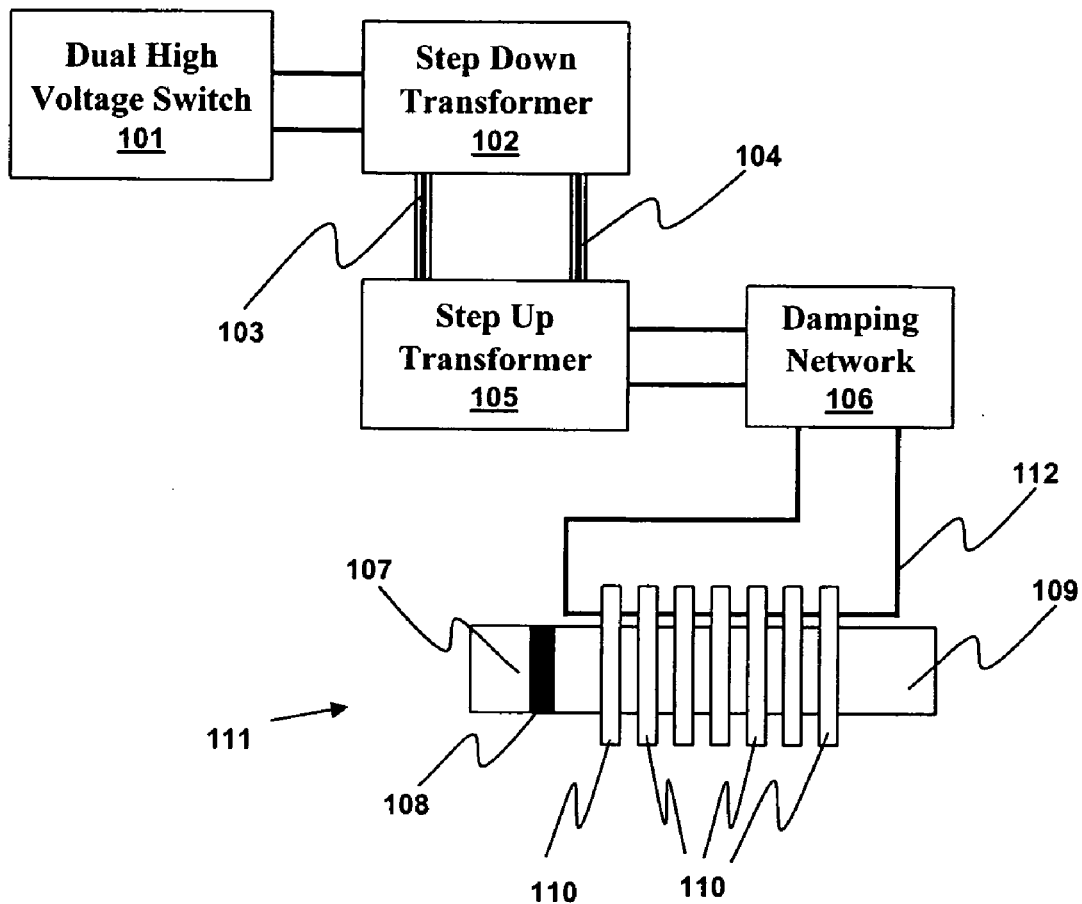
FIG. 1 illustrates a high level block diagram of a system for shaping charged particle bunches in accordance with an aspect of an embodiment.

FIG. 1 illustrates a high level block diagram of a system for shaping charged particle bunches in accordance with an aspect of an embodiment. A dual high voltage switch 101 can produce a voltage waveform that can be transmitted to a damping network 106. A step down transformer 102 can accept the voltage waveform and increase its voltage while decreasing its current. The waveform can then be sent through a first transmission line 103 and a second transmission line 104 to a step up transformer 105. The step up transformer 105 can decrease the voltage and increase the current of the voltage waveform.

The damping network 106 can condition the voltage waveform before it is passed through a coupling wire 112 that runs adjacent to a pipe 111. The pipe 111 includes three sections: a first conductive section 107, a second conductive section 109, and a ceramic gap 108 separating the conductive sections.

The pipe 111 and the coupling wire 112 run through one or more cores 110 made with a nanocrystalline magnetic material such as Finemet, Nanoperm, or Hitperm. In a properly functioning device, the pipe 111, coupling wire 112, and cores 110 are surrounded by a shield (not shown) as is illustrated in FIG. 2.

Figure 2:
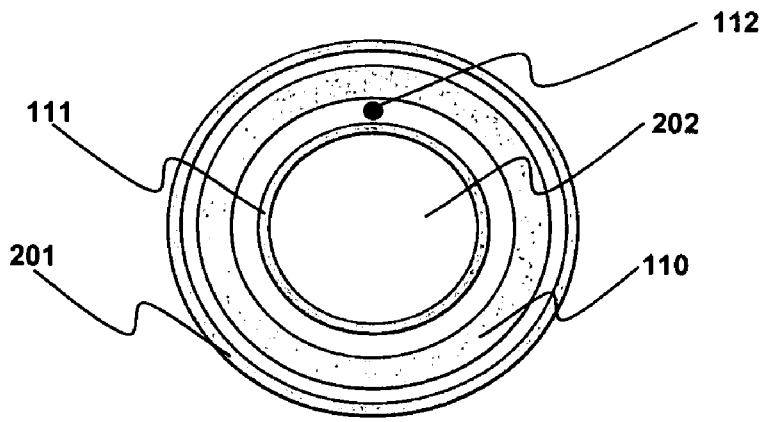
FIG. 2 illustrates shielded cores with a pipe and coupling wire running through them in accordance with aspects of the embodiments.

FIG. 2 illustrates shielded cores 110 with a pipe 111 and coupling wire 112 running through them in accordance with aspects of the embodiments. A shield 201 surrounds the cores 110. The pipe interior 202 can also be seen. The pipe interior 202 is usually kept in vacuum, meaning most of the air is removed. The shield 201 surrounding the cores is necessary because it constrains the electric and magnetic fields.

Figure 3:
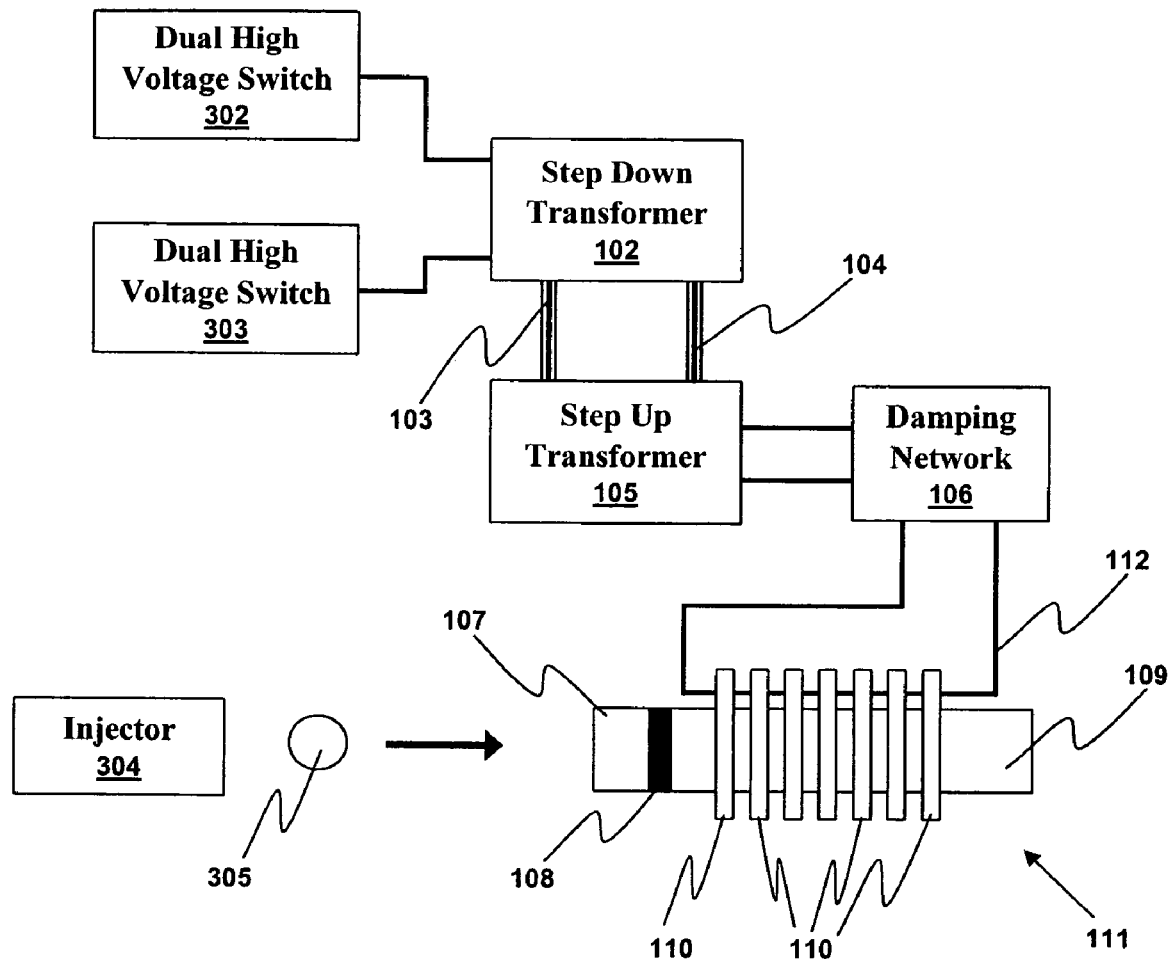
FIG. 3 illustrates a high level block diagram of a system for shaping charged particle bunches in accordance with an aspect of an embodiment.
Figure 8:
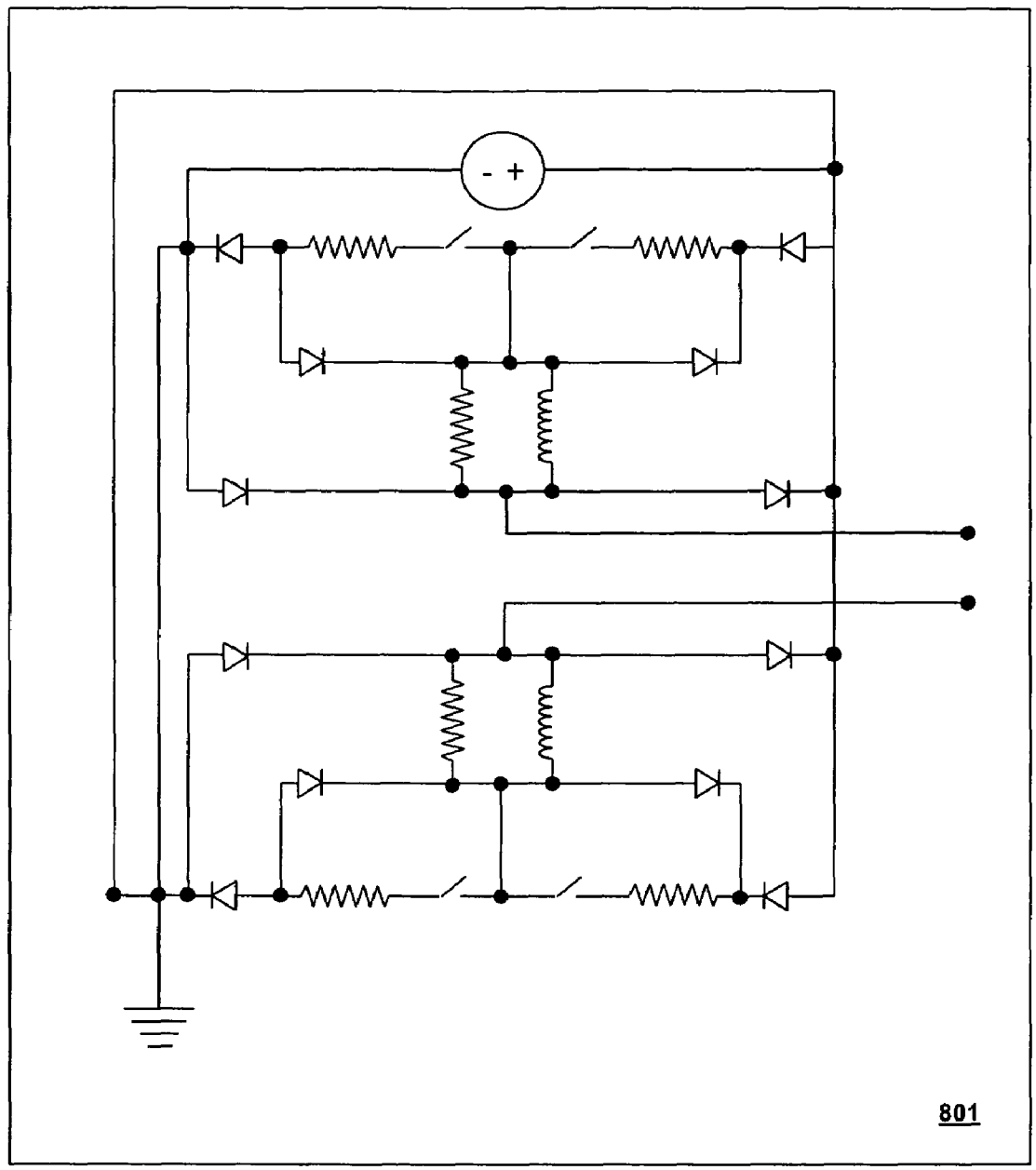
FIG. 8 illustrates a circuit schematic for a device that can produce electrical pulses in accordance with aspects of certain embodiments.

FIG. 3 illustrates a high level block diagram of a system for shaping charged particle bunches in accordance with an aspect of an embodiment. FIG. 3 is similar to FIG. 1 with a few exceptions. The voltage waveform can be produced using both a first dual high voltage switch 302 and a second dual high voltage switch 303. Dual high voltage switches 302, 303, such as the HTS 161-06-GSM made by Behlke, contain two high voltage switches and have been used in an embodiment. FIG. 8 illustrates a schematic diagram of a device that uses four high voltage switches to produce electrical pulses. The specific values for the components of FIG. 8 are not shown because one practiced in the art of pulsed power can choose components as required. An injector 304 is shown sending a charged particle bunch 305 into the end of the pipe 111.

Figure 4:
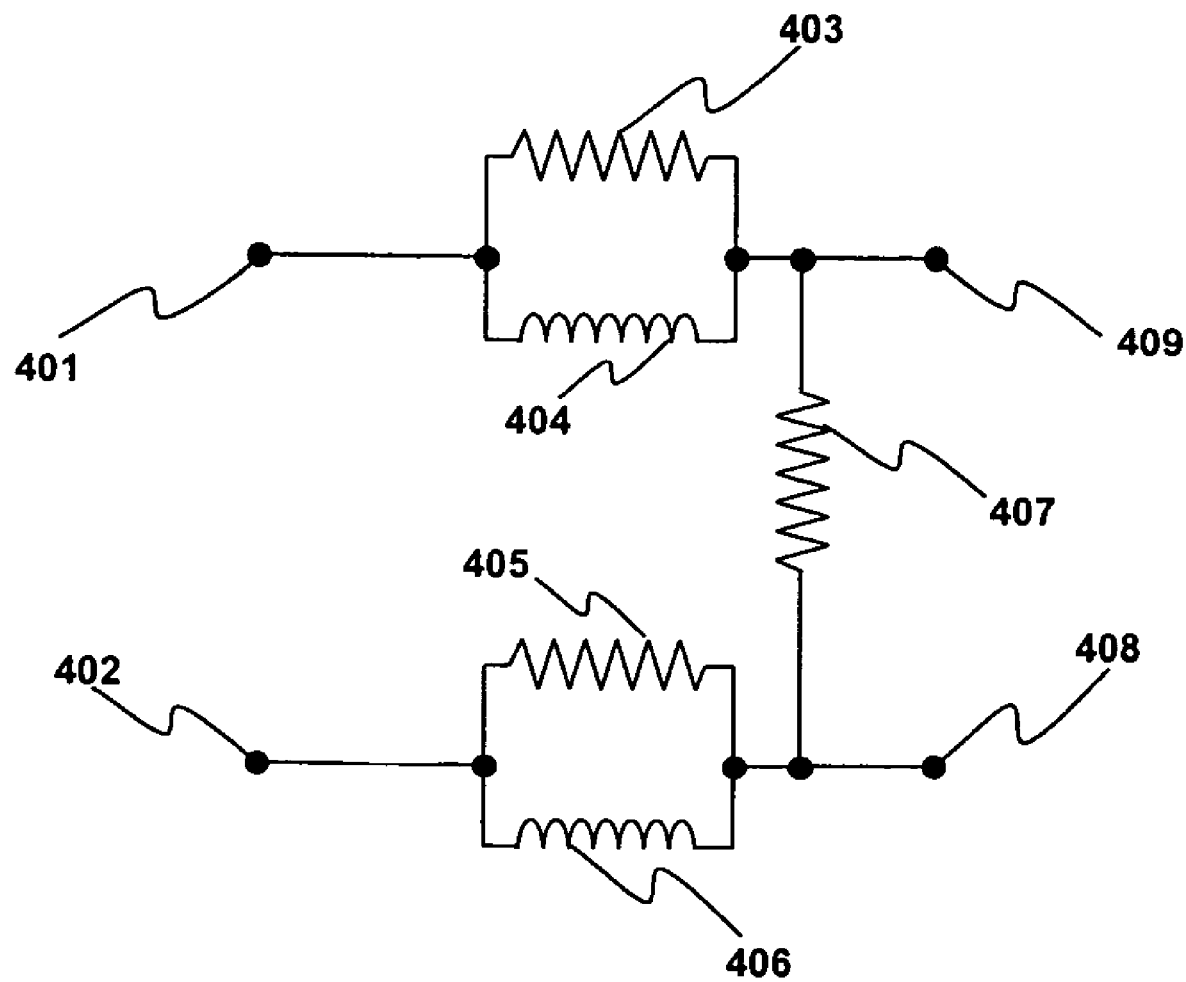
FIG. 4 illustrates a damping circuit in accordance with aspects of certain embodiments.

FIG. 4 illustrates a damping circuit in accordance with aspects of certain embodiments. The damping circuit has a first input node 401 and a second input node 402 that can receive a voltage waveform. The circuit has a first output node 409 and a second output node 408 that can be connected to the conductive sections of a pipe. In a functioning embodiment, the first resistor 403 and second resistor 405 are 230 Ohm resistors while the third resistor 407 is a 1500 Ohm resistor. In the same embodiment, the first inductor 404 and second inductor 406 are both 10 micro-Henry inductors.

Figure 5:
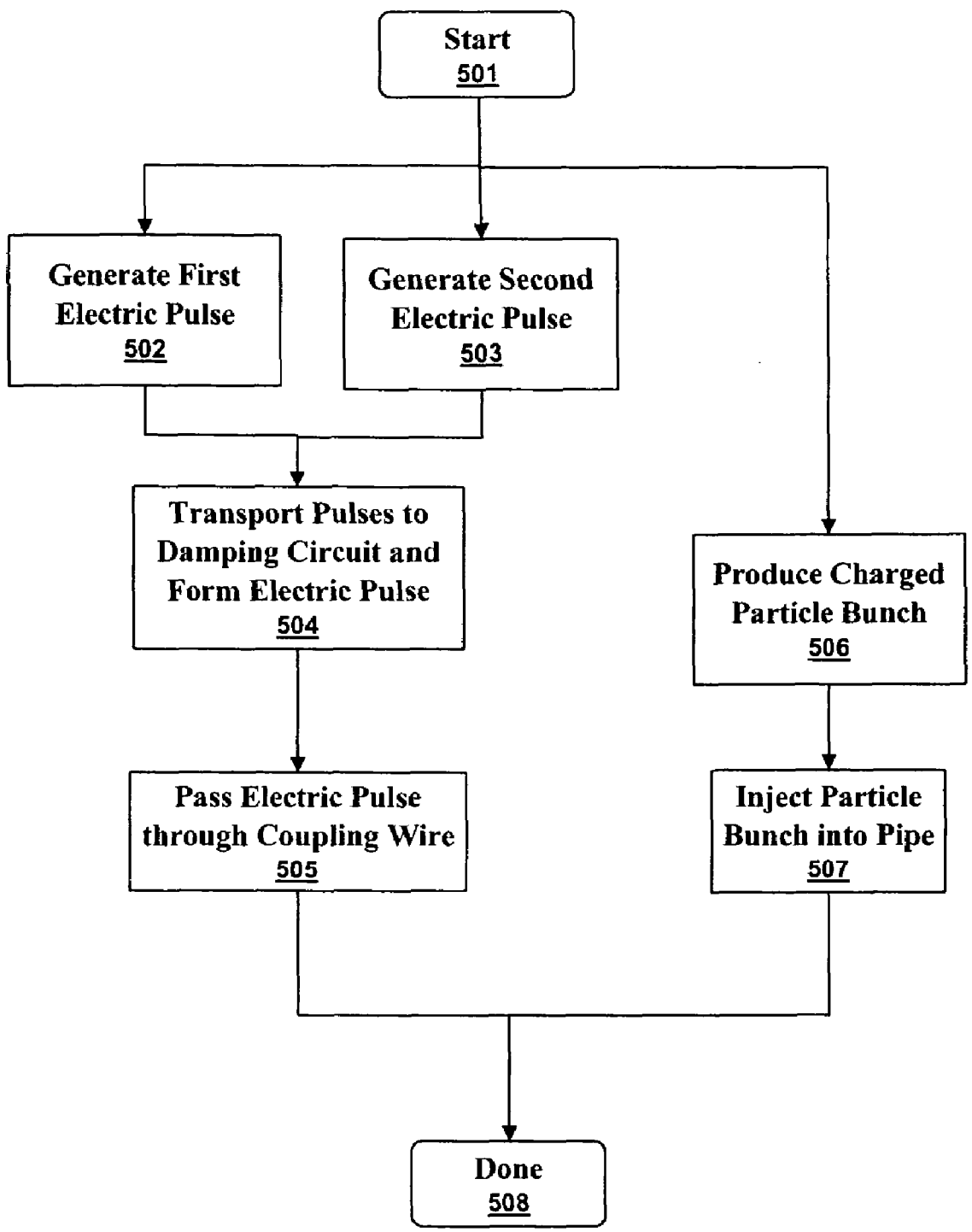
FIG. 5 illustrates a high level flow diagram of shaping charged particle bunches in accordance with aspects of certain embodiment.
Figure 6:
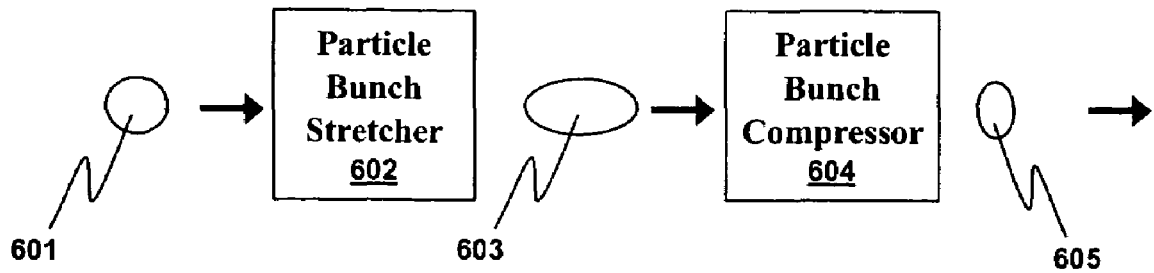
FIG. 6, labeled as "prior art", illustrates shaping a charged particle bunch.
Figure 7:
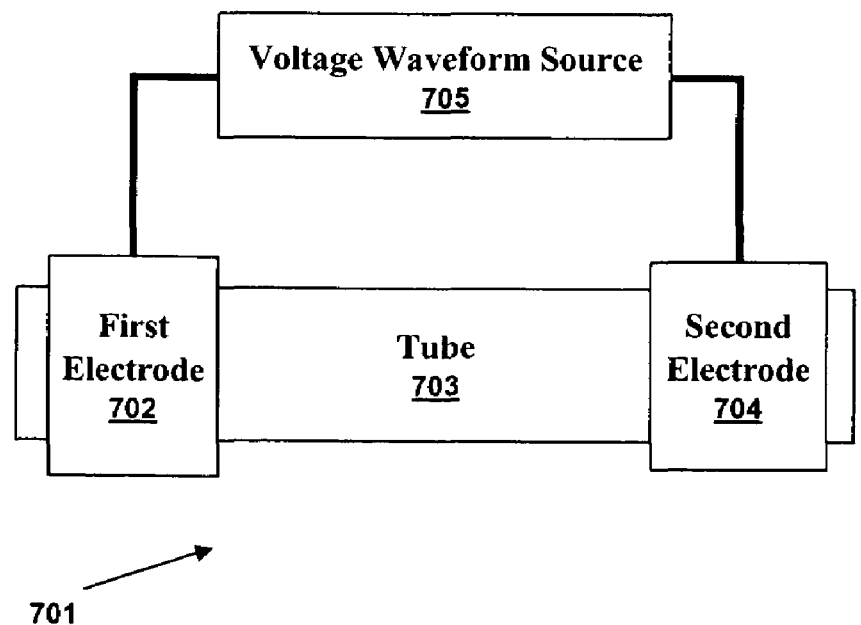
FIG. 7, labeled as "prior art", illustrates a particle bunch shaper.

FIG. 5 illustrates a high level flow diagram of shaping charged particle bunches in accordance with aspects of certain embodiments. After the start 501, three synchronized events occur. A first electric pulse is generated 502, a second electric pulse is generated 503 and a charged particle bunch is produced 506. The pulses are transported to a damping circuit 504. As discussed above, transformers and transmission lines can be used to transport the pulses. Next, a voltage differential is formed along a pipe 505 as the charged particle bunch is injected into the pipe 507. The process for shaping one packet is then done 508.

The examples discussed above are intended to illustrate aspects of the embodiments. The phrases "an embodiment" or "certain embodiment" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system comprising:
a first dual high voltage switch electrically connected to a step down transformer;
a second dual high voltage switch electrically connected to the step down transformer;
a step up transformer electrically connected to the step down transformer by a first transmission line and by a second transmission line;
a damping network electrically connected to the output of the step up transformer;
a pipe comprising a first conductive section, a ceramic section, and a second conductive section;
at least one core comprising a nanocrystalline magnetic material wherein each of the at least one core is arranged such that the pipe goes through the center of the core; and
a coupling wire electrically connected to the damping network and passing adjacent to the pipe through the at least one core.

2. The system of claim 1 wherein the nanocrystalline magnetic material is an alloy comprising FeCuNbSiB.

3. The system of claim 1 wherein the nanocrystalline magnetic material is an alloy comprising FeZrNbCu.

4. The system of claim 1 wherein the nanocrystalline magnetic material is an alloy comprising FeCoZrBCu.

5. The system of claim 1 wherein the first conductive section is made of steel.

6. The system of claim 1 further comprising an injector and a particle bunch comprising charged subatomic particles or ions wherein the injector injects the particle bunch into one end of the pipe.

7. A system comprising:
   a first dual high voltage switch electrically connected to a damping network;
   a second dual high voltage switch electrically connected to the damping network;
   a pipe comprising a first conductive section, a ceramic section, and a second conductive section;
   at least one core comprising a nanocrystalline magnetic material wherein each of the at least one core is arranged such that the pipe goes through the center of the core; and
   a coupling wire electrically connected to the damping network and passing adjacent to the pipe through the at least one core.

8. The system of claim 7 wherein the nanocrystalline magnetic material is an alloy comprising FeCuNbSiB.

9. The system of claim 7 wherein the nanocrystalline magnetic material is an alloy comprising FeZrNbCu.

10. The system of claim 7 wherein the nanocrystalline magnetic material is an alloy comprising FeCoZrBCu.

11. The system of claim 7 wherein the first conductive section is made of steel.

12. A method comprising:
   generating a first electric pulse and transporting the first electric pulse to a damping circuit;
   passing the first electric pulse through the damping circuit to produce an electric pulse and passing the electric pulse through a coupling wire wherein the coupling wire passes through at least one core comprising a nanocrystalline magnetic material and wherein a pipe comprising a first conductive section, a ceramic section, and a second conductive section also passes through the at least one core;
   generating a second electric pulse and passing the second electric pulse through the damping circuit wherein the second electric pulse is synchronized with the electric pulse and wherein the second electric pulse is also used to form the electric pulse;
   producing a particle bunch comprising charged subatomic particles or ions; and
   injecting the particle bunch into one side of the pipe wherein the particle bunch injection is synchronized with passing the electric pulse through the coupling wire.

13. The method of claim 12 further comprising using a step down transformer, a first transmission line, a second transmission line, and a step up transformer to transport the first electric pulse and the second electric pulse to the damping circuit.

14. The system of claim 12 wherein the nanocrystalline magnetic material is an alloy comprising FeCuNbSiB.

15. The system of claim 12 wherein the nanocrystalline magnetic material is an alloy comprising FeZrNbCu.

16. The system of claim 12 wherein the nanocrystalline magnetic material is an alloy comprising FeCoZrBCu.

* * * * *